United States Patent

[11] 3,557,821

| [72] | Inventors | William J. Siegel<br>Silver Spring;<br>Linus E. Wallgren, Rockville; Loring E.<br>Young, Frederick and John Ravinsky,<br>Rockville, Md. |
|---|---|---|
| [21] | Appl. No. | 846,715 |
| [22] | Filed | Aug. 1, 1969 |
| [45] | Patented | Jan. 26, 1971 |
| [73] | Assignee | Pace, Incorporated, Silver Spring, Md.,<br>a corporation of the District of Columbia |

[54] BY-PASS VALVE
10 Claims, 10 Drawing Figs.

[52] U.S. Cl. .................................................. 137/269.5
    137/539, 137/614.2; 251/146, 251/208
[51] Int. Cl. ................................................... F16k 15/04,
    F16k 17/04
[50] Field of Search ........................................... 228/20;
    137/271, 269.5, 269, 270, 270.5, 516, 539, 539.5,
    526, 614.2; 251/146, 208

[56] References Cited
UNITED STATES PATENTS

| 1,272,998 | 7/1918 | Rasmussen ................. | 251/146 |
| 2,631,600 | 3/1953 | Flanagan ..................... | 137/269 |
| 2,922,432 | 1/1960 | Huntington et al. ......... | 137/269.5 |
| 3,392,897 | 7/1968 | Siegal ......................... | 228/20 |
| 3,411,594 | 11/1968 | Siegal ......................... | 228/20X |

Primary Examiner—M. Cary Nelson
Assistant Examiner—Robert J. Miller
Attorney—Fidelman, Wolffe & Leitner ABSTRACT: The present invention is directed to a flow control bypass valve adapted to bleed off up to about 90 percent of the gas passing through a gas line. The structure involves a bypass gas outlet aperture in a cylindrical valve body through which the gas flows and a spring biased ball check valve assembly mounted for rotational movement around the valve body so that the intake port of the check valve can be placed into any desired degree of registry with the bypass outlet or act to expose the bypass outlet to the open atmosphere to any desired extent.

PATENTED JAN 26 1971 3,557,821
SHEET 1 OF 2
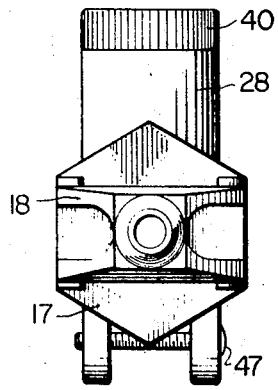
FIG. 3
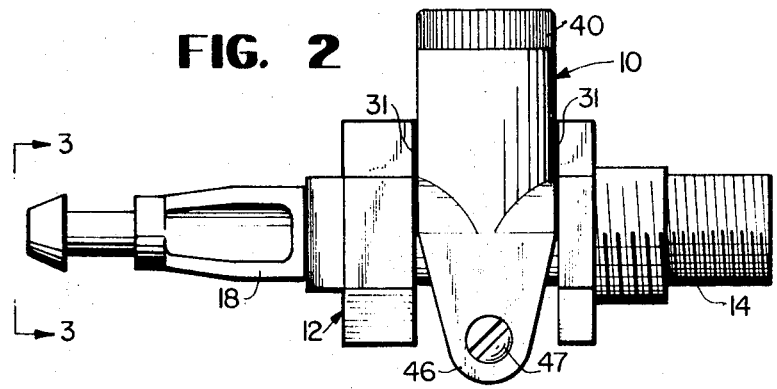
FIG. 2
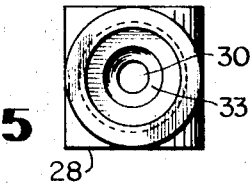
FIG. 5
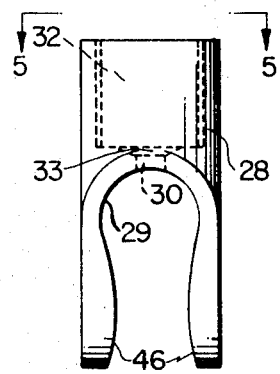
FIG. 4
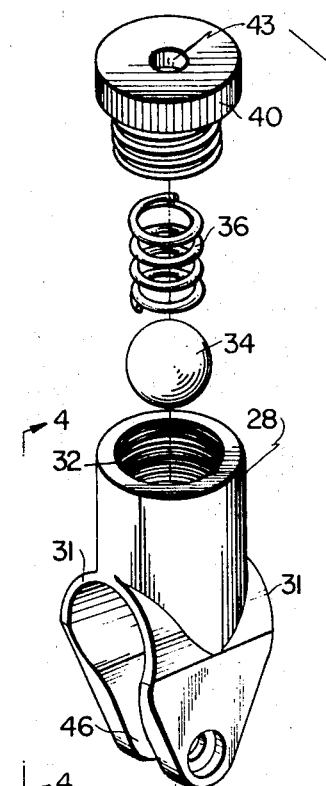
FIG. 1
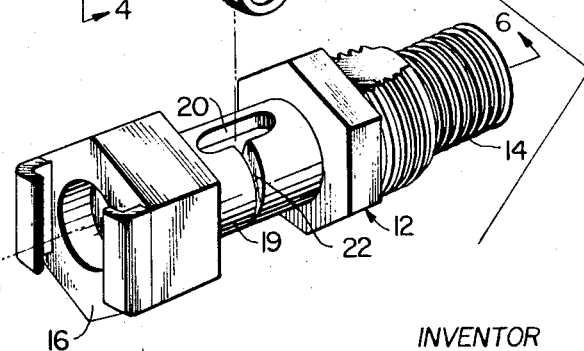
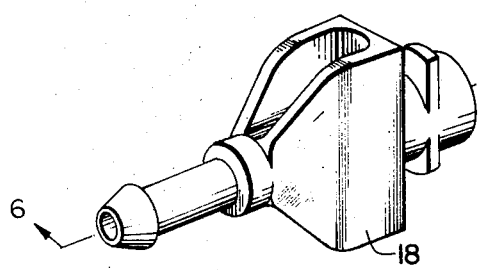
INVENTOR
BY
ATTORNEYS

PATENTED JAN 26 1971     3,557,821

BY-PASS VALVE

The present invention relates to a bypass flow control valve capable of bypass venting controlled quantities of gas out of a gas flow path.

Instances exist where an inexpensive source of vacuum or of compressed air under moderate pressures such as for example up to 50 p.s.i.g. is desired to fill a need involving low gas flow rates (such as 5 c.f.m.) A constant speed fractional horsepower AC motor and a simple rotary compressor directly driven by the motor is an efficient, inexpensive source of compressed air in small quantities. This system provides a fixed supply of compressed gas at a predetermined design pressure. However, the close control over flow rate and gas pressure usually desired by the user, is inconsistent with the constant speed motor-compressor system. A variable speed motor is more expensive and in addition, some electrical controls would be needed to vary motor speed.

Since the user is not concerned with loss of air, the acceptable control system can be a bleedoff valve interposed in the air line between compressor and point of use. The bleedoff valve controls downward, so to speak, by wasting some air into the atmosphere at the valve structure, permitting only the desired flow of compressed air to the point of use.

The principle object of the present invention is to provide a bleedoff valve assembly.

A further object of the present invention is to provide a valve structure which is adapted almost interchangeably for bleeding off air from a compressed air line and for bleeding bypass air into a suction line.

Still another object is to provide a valve structure capable of being fabricated from plastic material by plastic molding techniques.

Further objects of the present invention and the advantages thereof will be more apparent from the description of the valve assembly which follows.

Briefly the valve structure of the present invention is adapted to be inserted into a flexible tube compressed gas line. Preferably the valve is threaded directly to the outlet fitting of a small centrifugal pump. The main valve body is an open ended cylinder providing therethrough a gas flow path. On the cylindrical circumference of the valve body is an orifice through which gas may be bypassed into or out of the flow path, as desired. A spring biased ball check valve assembly straddles the cylindrical valve body and is rotatable therearound. This structure provides a multiplicity of possible positions including: a valve closed position where no bleedoff can occur; a safety valve position where bleedoff through the spring biased check valve occurs at a predetermined gas pressure; and a gas dump position where the orifice is exposed and gas is vented directly to the atmosphere.

In addition, the spring biased ball check valve structure includes spring pressure adjustment means, permitting the user to preset whatever gas pressure the ball check should lift. Desirably the ball and spring can be reversed so that the same check valve assembly structure can be either a pressure check valve or a vacuum check valve.

Also the bypass orifice on the cylindrical valve body is contoured to permit the user to control the quantities of gas dumped directly and that passing through the compressed gas line to the point of use.

As a whole, the valve structure of the present invention permits a surprisingly close degree of control over both flow rate and pressure despite use of a constant speed motor-compressor system for providing the compressed gas.

For further understanding of the invention, reference is now made to the attached drawings wherein:

FIG. 1 is an exploded view of the valve structure of the present invention;

FIG. 2 is a side view of the assembled bypass valve;

FIG. 3 is an end view taken along lines 3–3 of FIG. 2;

FIG. 4 is an a side view of the check valve housing taken along lines 4–4 of FIG. 1;

FIG. 5 is a top view of the check valve housing taken along lines 5–5 of FIG. 4;

Figure 6:
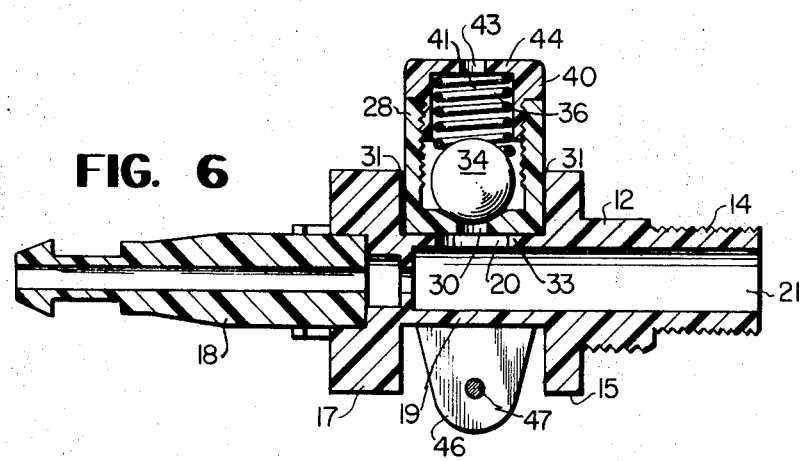
FIG. 6 is a side section of the assembled valve taken along lines 6–6 of FIG. 1.
Figure 8:
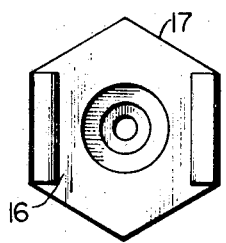
FIG. 8 is an end view of the main valve body taken along lines 8–8 of FIG. 7.
Figure 7:
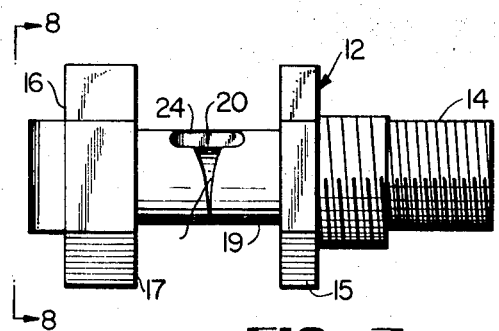
FIG. 7 is a side view of the main valve body.
Figure 9:
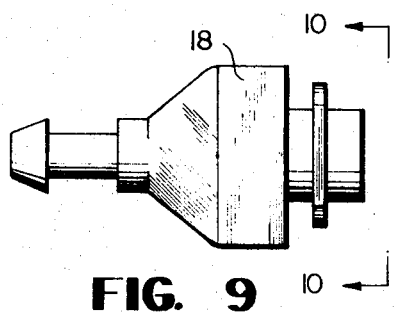
FIG. 9 is a side view of the tube end piece of the valve.
Figure 10:
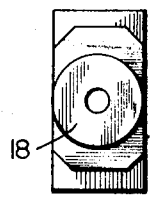
FIG. 10 is an end view of the end piece taken along lines 10–10 of FIG. 9.

As may be seen in the drawings, the flow control bypass valve assembly 10 is made up of a main valve body 12 which has at one end a threaded nipple structure 14 and at the other end a quick connect joint 16 adapted for gastight sealing connection with an end piece 18 which in turn is adapted for sealing insertion into flexible pressure tubing. A cylindrical center portion 19 on main valve body 12 has therein a valve orifice 20 which can bypass some of the gas normally flowing through the central passageway 21 of valve body 12. Cylindrical center portion 19 is founded at one end by a flange 15 forming the base of the threaded nipple 14 and at the other end by the flange 17 which forms the base of the quick connect joint 16.

A check valve housing 28 is adapted to seat rotatably around the cylindrical center portion 19 of valve body 12 with appropriately semicylindrical base 29 thereof closely fitting the cylindrical center portion 19. Check valve housing 28 is provided with flat side faces 31 which bear against the flanges 15 and 17; the check valve housing 28 just fits between flanges 15 and 17. As may be seen in the drawings, check valve housing 28 is bifurcated, legs 46 depending from base 29 to below the level of cylindrical center portion 19. A bolt and nut fastener means 47 placed in apertures near the bottom of legs 46 secures check valve housing 28 on valve body 12 in a tight but rotatable seat thereon. This check valve housing 28 is in close fitting contact with half and more of center portion 19 yet leaves exposed a substantial area of center portion 19, i.e., the underside area facing fastener means 47.

At the base 29 of check valve housing 28 is a valve port 30 leading to a central passageway 32 therein. The central passageway 32 is substantially larger than port 30 leaving therebetween an annular shoulder 33 around port 30 shaped into a valve seat for ball 34. The outer periphery of central passageway 32 is threaded, at least in its upper portion so that threaded cap 40 may be threaded thereinto. Cap 40 contains a central aperture 41 and a top port opening 43 surrounded by an annular shoulder 44 which serves as a seat for compression spring 36 (see FIG. 6). Thus when check valve structure is assembled as a pressure check valve ball 34 seats on port 30 and is maintained in closed position, sealing port 30, by compression spring 36. The other end of spring 36 is seated on annular shoulder 44 inside the cap 40. The pressure on spring 36 can be adjusted by threading cap 40 into or out on the check valve housing 28. Whenever checking valve housing 28 is rotated to a position which places ports 20 and 30 in registry, the check valve assembly prevents flow of gas from central passageway 21 past the ball check and out cap port 43 unless the gas pressure on ball 34 exceeds the bias imposed thereon by spring 36.

The same housing 28, cap 40, ball 34 and spring 36 structure may be used as a vacuum check simply by reversing the position of spring and ball with ball 34 now seated on the annular shoulder 44 of cap port 43. Then the ball 34 unseats against the bias of spring 36 only whenever suction inside central passageway 21 exceeds whatever predetermined set has been placed on spring 36 by cap 40.

Allusion has already been made to the possibility of rotating check valve housing 28 on cylindrical portion 19. Such rotation moves port 30 of the check valve into or out of registry with valve orifice 20 on the cylindrical center portion 19 of main valve body 12. The size of ports 20, 30 relative to the circumferential areas of center portion 19 and seat 29 are such that three full positions of check valve housing 28 are available, i.e. registry of ports 20, 30 so that the safety valve capabilities of the check valve are employed; an off registry position blanking off both ports 20, 30; and a dump position exposing orifice 20 so that gas vents or dumps directly to the atmosphere therethrough.

In order to provide more than simple on-off adjustments, particularly for the dump position, port orifice 20 is a relatively complex opening on the surface of cylindrical portion 19. An elliptical section 24 is provided as part of orifice 20 for full registry with port 30. Provision of the elliptical shape allows for a small degree of clearance between the flat side faces 31 of check valve housing 28 and the flanges 15 and 17 which bound cylindrical center portion 19. For varying degrees of partial registry between ports 20 and 30 or controllable dump directly to the atmosphere an elongated contoured V-shaped slot opening 22 extends circumferentially around the center cylindrical portion 19 with the bounding margins thereof providing an ever narrower orifice opening until the head of the V is reached. The V-shaped slot portion 22 permits control of gas bypass by how much of the V and what part thereof the user places either in registry with the port 30 on check valve housing 28 or exposes directly to the atmosphere.

Thus, not only is a bypass valving arrangement provided by the check valve structure but in addition the degree of registry of port 30 with either the V slot portion 22 or the elliptical portion 24 of valve orifice 20 further limits the bypass flow through the check valve from full open position to completely closed position. The same is true with registry directly to the atmosphere. It should, of course, be appreciated that even the full open (in registry) position of port 30 with elliptical port portion 24, and with a slack spring pressure applied by cap 40, only a part of the gas flowing through central passageway 21 will be bypassed through the check valve assembly. Some minimum quantity of gas, about 20 percent of the flow, will continue to flow the central passageway 21 to the outlet of the pressure tubing attached to end piece 18. Dumping the gas, by exposing orifice 20, reduces the gas pressure inside passageway 21 virtually to zero gauge and vents almost the entire flow (e.g. about 90 percent).

Since reversing the ball and spring position, that is seating the ball on seat 44 inside cap 40 and the spring on annular shoulder 33 inside check valve housing 28 permits the same bypass valve assembly 10 to operate on the suction side of a compressor, a like degree of control is available when suction is employed. Bypass air in controlled quantities may be drawn into a gas line on the suction side of the gas compressor, controlling thereby the extent of the suction applied at the intended point of use. Suction control is very important to proper use of the Solder Extractor described in U.S. Pat. No. 3,392,897.

The bypass valve assembly of the present invention can serve as a safety valve for the motor-compressor system and also at the point of application. If too much suction or too much pressure suddenly appears at the point of application the pressure or suction buildup in central passageway 21 causes ball 34 to lift; thereby bypassing more of the air flow and maintaining pressure or suction at the point of application to some predetermined maximum value. The desirability for a variable control bypass valve assembly on both the suction and pressure sides of a small gas compressor is real. U.S. Pat. No. 3,411,594 illustrates one illustrates one form of equipment which employs a small motor-compressor system and where presence of a bypass valve assembly on both the suction side and the pressure side of the motor-compressor is advisable.

We claim:

1. A bypass gas flow control valve comprising:
   a. a main valve body having a central gas passageway therethrough and a bypass orifice thereon;
   b. a check valve assembly formed by a centrally apertured housing and a centrally apertured threaded cap thereon and having therein an inlet port and an outlet port and a spring biased ball check normally sealing one of said ports, said outlet port being the entrance to the aperture in the cap;
   c. said check valve assembly being movable as a whole relative to the main valve body whereby the inlet port thereof may be placed in any desired degree of registry with the bypass orifice of said main valve body.

2. The apparatus of claim 1, wherein the spring biased ball check may be seated on either port whereby the bypass flow control valve structure is alternatively employable for pressure bypass purposes and for suction bypass purposes.

3. The apparatus of claim 1, wherein: said bypass outlet orifice is on a cylindrical portion of the main valve body; the inlet port on said check valve assembly is formed in a cylindrical portion of said check valve housing; and said check valve housing straddles the cylindrical portion of said main valve body whereby the movement of said check valve assembly relative to the main valve body is rotation of the cylindrical portions, one relative to the other.

4. An apparatus as in claim 3, wherein: the check valve housing is formed with a pair of legs which straddle said cylindrical portion of the main valve body and depend therefrom, and fastening and tightening means are disposed on said leg portions.

5. The apparatus of claim 1, wherein: said orifice on the main valve body comprises a contoured V-shaped extended slot, the slot extending in the direction of the relative movement between the check valve assembly and the main valve body.

6. The apparatus as in claim 5, wherein an enlarged orifice opening is provided on said main valve body at the base of the V-shaped slot, said orifice opening being at least as large as the check valve inlet port whereby full open registry, port to orifice opening may be obtained.

7. The apparatus of claim 1, wherein: the bypass outlet orifice is disposed on a cylindrical portion of the main valve body and is comprised of a contoured V-shaped slot extending circumferentially of said cylindrical portion and an enlarged opening at the base of the V-shaped slot; the inlet port of said check valve assembly is circular and is disposed on a cylindrically shaped lower portion of said check valve housing; and wherein said check valve housing is seated around the cylindrical portion of the main valve body whereby the relative movement between the main valve body and check valve assembly is rotation to provide thereby varying degrees of partial registry, full registry and nonregistry positions.

8. The apparatus of claim 1, wherein: said bypass outlet orifice is on a cylindrical portion of the main valve body; the inlet port on said check valve assembly is formed in a semicylindrical portion of said check valve housing; said check valve housing straddling the cylindrical portion of said main valve body whereby the movement of said check valve assembly relative to the main valve body is rotation of cylindrical portions, one relative to the other, the check valve housing being formed also with a pair of legs which depend from said cylindrical portion of the main valve body, and fastening and tightening means are disposed on said leg portions whereby a substantial area of said cylindrical portion of the main valve body is exposed and movement of said check valve assembly can expose said bypass outlet orifice.

9. The apparatus of claim 8, wherein: said orifice on the main valve body comprises a contoured V-shaped extended slot, the slot therein extending in the direction of the relative movement between the check valve assembly and the main valve body.

10. A bypass gas flow control valve comprising:
   a. a cylindrical main valve having a central gas passage therethrough and a bypass orifice in the cylindrical surface thereof;
   b. a check valve assembly including a semicylindrical portion seating on the cylindrical surface of the main valve, the inlet port of said check valve assembly being on said semicylindrical portion thereof; said check valve further having a pair of legs which depend from the semicylindrical portion thereof and straddle the main valve leaving exposed the straddled underside portion of the main valve;
   c. said check valve assembly being rotatable as a whole relative to the main valve whereby the inlet port thereof may be placed alternatively in registry with the orifice thereon, out of registry with the orifice, and the orifice exposed for direct bypass venting of gas.